United States Patent [19]
Hurkamp

[11] 3,774,864
[45] Nov. 27, 1973

[54] CARGO AIRCRAFT HAVING INCREASED PAYLOAD CAPACITY VERSUS WEIGHT

[75] Inventor: Charles H. Hurkamp, Hilton Head Island, S.C.

[73] Assignee: Lockheed Aircraft Corporation, Burbank, Calif.

[22] Filed: July 19, 1971

[21] Appl. No.: 163,813

[52] U.S. Cl. ............... 244/13, 244/36, 244/42 CC, 244/123
[51] Int. Cl. .......................... B64c 1/00, B64c 3/02
[58] Field of Search .................... 244/12 R, 13, 15, 244/36, 42 CC, 87, 112, 117 R, 118 R, 118 P, 119, 123, 137 R, 129 D; 105/357, 361; 214/84; 114/.5 R

[56] References Cited
UNITED STATES PATENTS

| | | | |
|---|---|---|---|
| 2,224,641 | 12/1940 | Burnelli | 244/36 |
| 2,759,691 | 8/1956 | Weaver et al. | 244/118 R |
| 3,244,246 | 4/1966 | Weiland | 244/12 R |
| 3,348,513 | 10/1967 | Dishart | 114/.5 R |
| 3,362,659 | 1/1968 | Razak | 244/15 |
| 3,414,077 | 12/1968 | Earl et al. | 244/12 R |
| 2,326,819 | 8/1943 | Berlin | 244/13 |
| 2,554,122 | 5/1951 | Robert | 244/123 |
| 2,938,686 | 5/1960 | Van Winkle et al. | 244/118 R |
| 3,417,946 | 12/1968 | Hartley | 244/87 |

FOREIGN PATENTS OR APPLICATIONS 736,071  6/1943  Germany ........................ 244/13

*Primary Examiner*—Duane A. Reger
*Assistant Examiner*—Jesus D. Sotelo
*Attorney*—John J. Sullivan et al.

[57] ABSTRACT

An aircraft configuration provides for structural arrangement whereby large cargo aircraft with appreciably increased pay-load capacity for a given airframe weight is possible. This configuration lends itself to the incorporation of optimum lift, thrust and landing systems. The total result is a large cargo aircraft capable of competing costwise with surface transportation modes.

16 Claims, 12 Drawing Figures

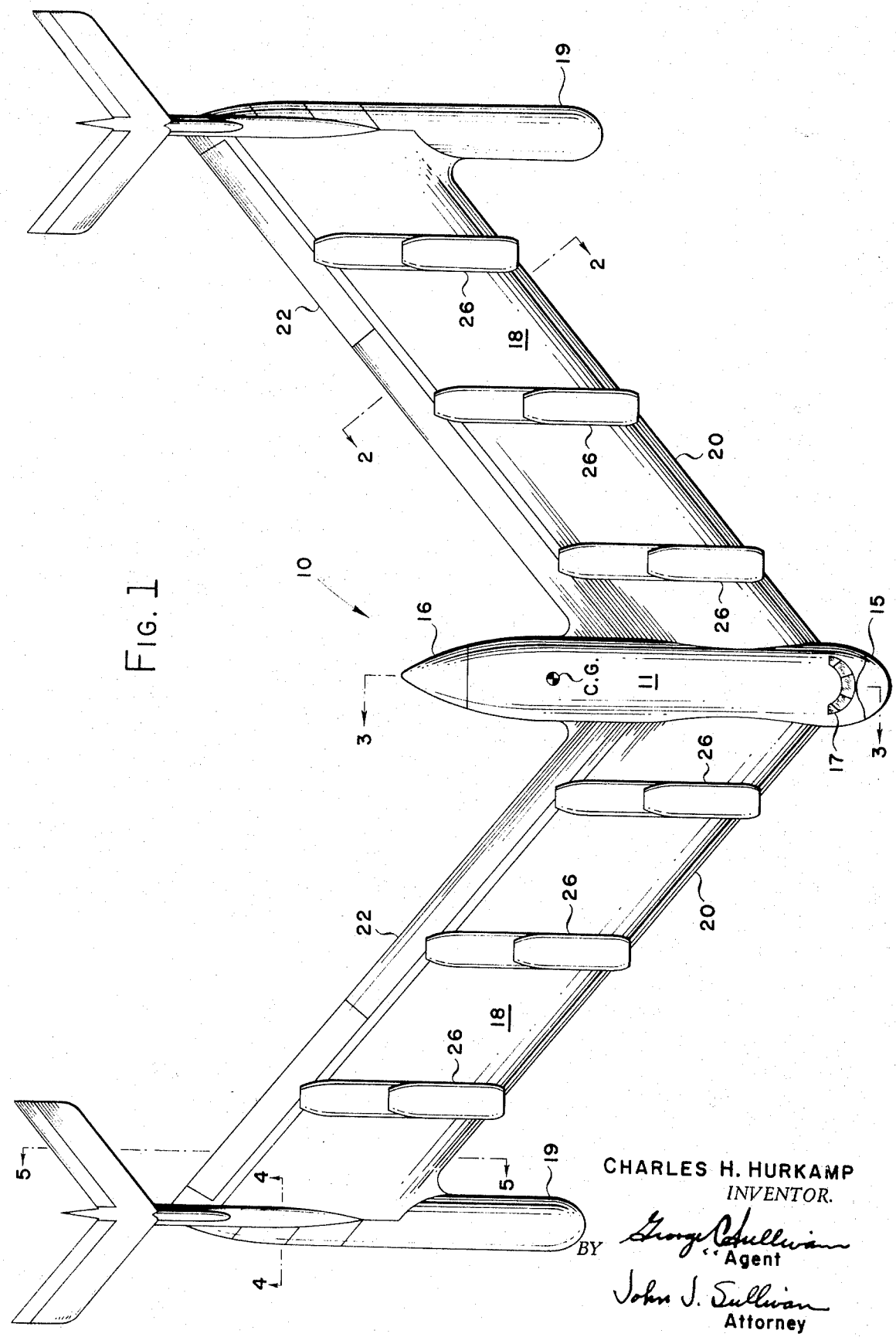

PATENTED NOV 27 1973 3,774,864

CHARLES H. HURKAMP
INVENTOR.

BY *George C Sullivan*
Agent

*John J. Sullivan*
Attorney

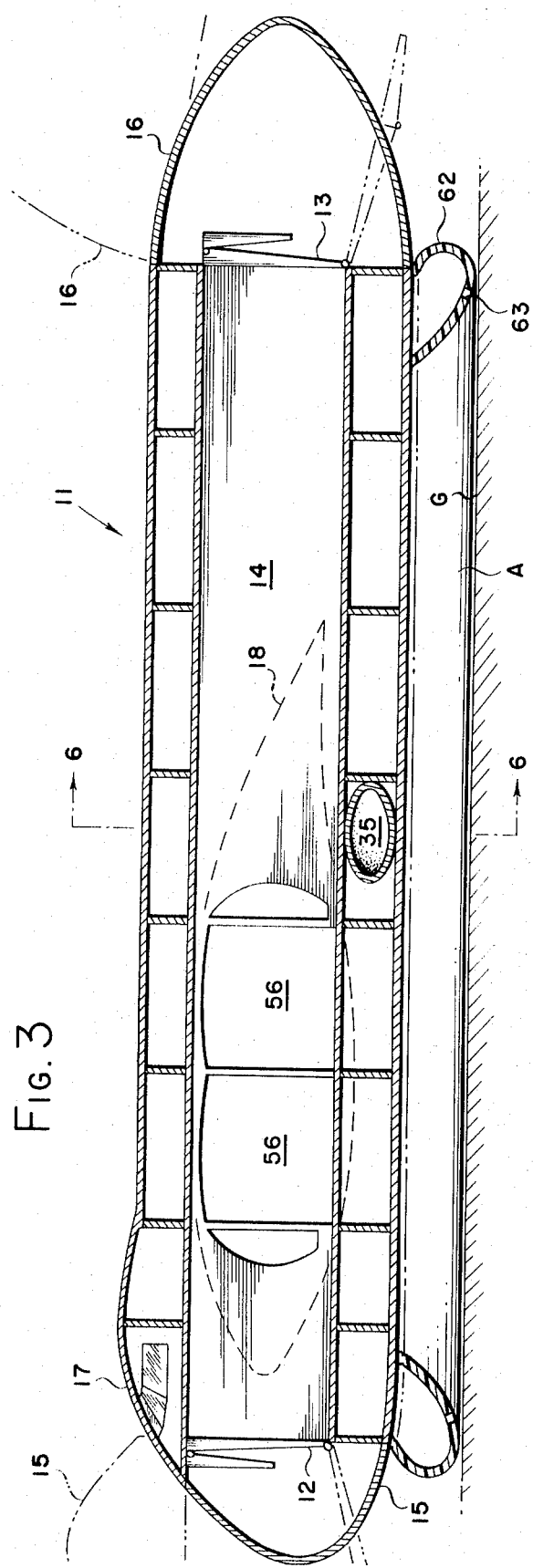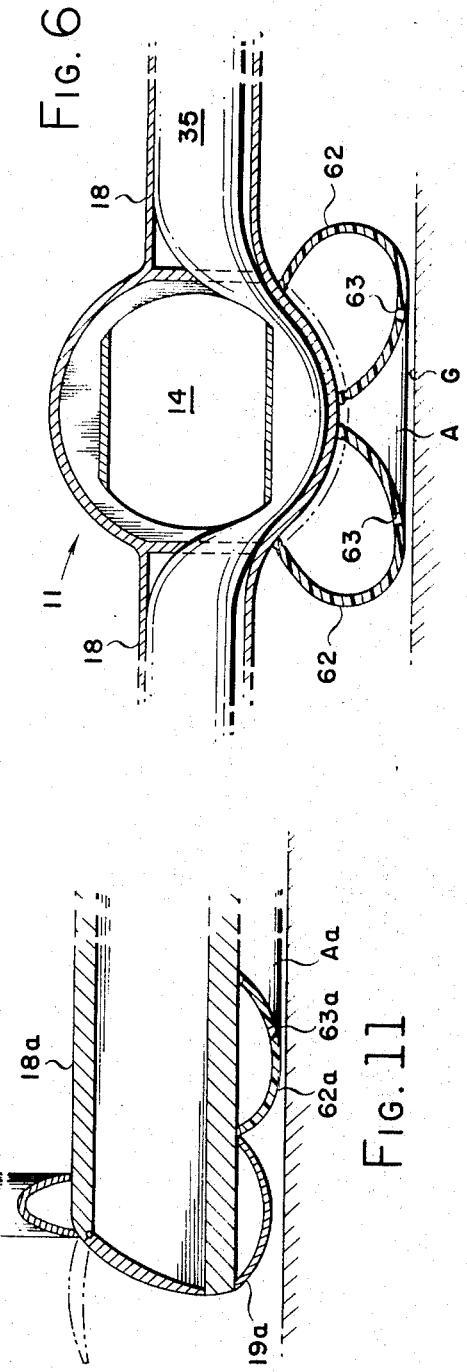

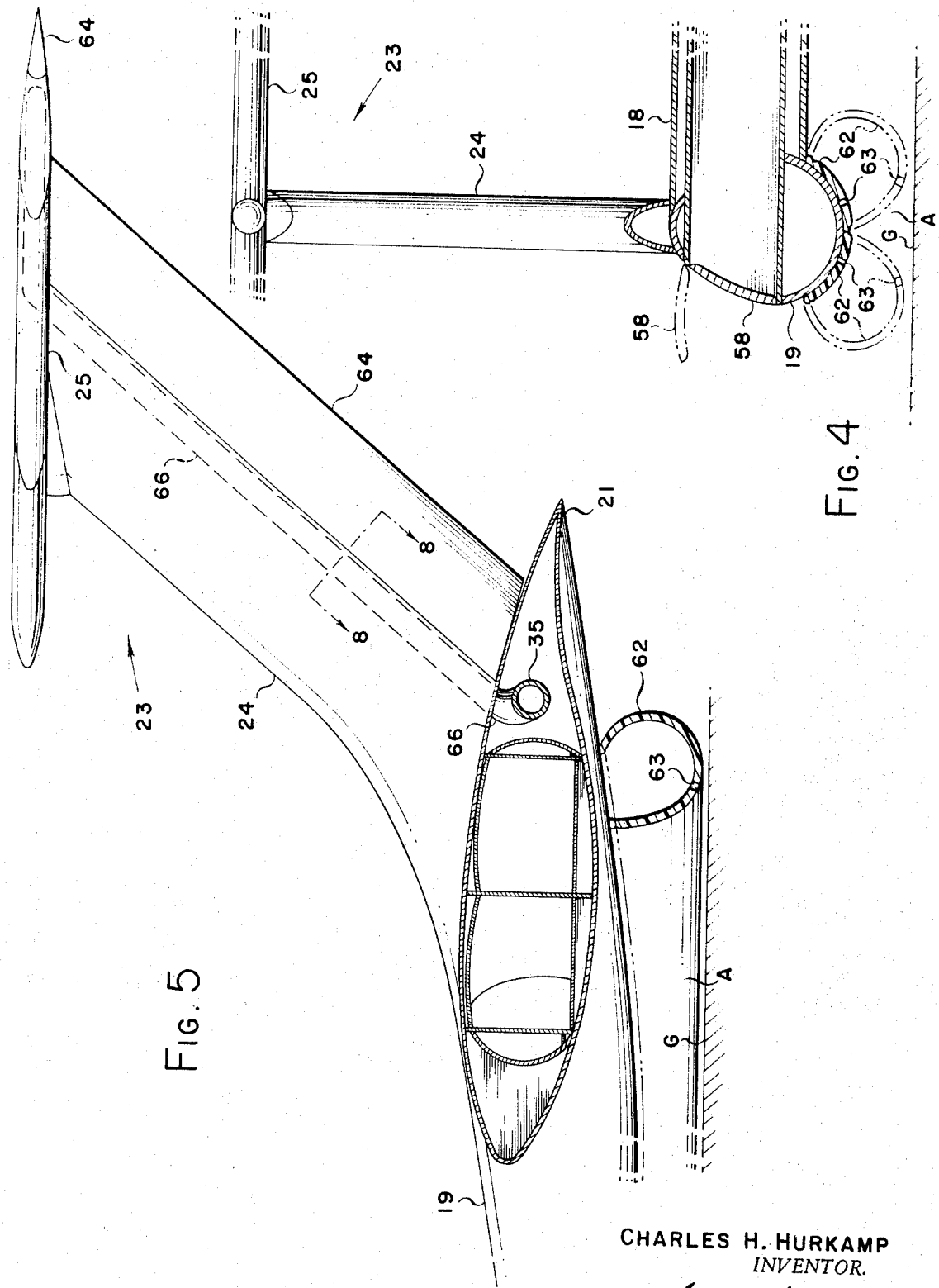

CHARLES H. HURKAMP
*INVENTOR.*

BY George C. Sullivan
Agent

John J. Sullivan
Attorney

CARGO AIRCRAFT HAVING INCREASED PAYLOAD CAPACITY VERSUS WEIGHT

This invention relates to cargo type aircraft, and more particularly to such an aircraft of selected design and configuration so as to permit the adjustment of its load carrying capability with respect to its basic weight as well as its lift to drag to the end that maximum payload capacity can be realized for a given airframe weight.

In an effort to compete with surface transportation modes from a cost standpoint, cargo aircraft have grown increasingly larger until they have now reached a point where further size increases alone no longer result in a net gain, i.e., the point of diminishing returns. Thus, a size has been attained where increased payload capacity requires the addition of corresponding weight and drag. The ratios of payload to empty aircraft weight and lift to drag have been extended to a practical limit by various refinements heretofore made with respect to materials and structure, as well as by engine performance, i.e., thrust or power output.

At the same time, use of abnormally large cargo aircraft aggravates the total operating conditions and creates new problems therein with respect to aircraft range, landing and take-off performance (due not only to aircraft operation, but to runway and terminal requirements) and the like. These have resulted in such developments, for example, as boundary layer control, whereby air stagnation on the external surfaces of the airplane is eliminated by various schemes and devices, such as by blowing and suction of air to produce a laminar flow over the upper surface of the wing for drag reduction and over the deflected trailing edge of the wings to effect lift augmentation.

The present invention comtemplates a totally different approach toward a new generation of cargo aircraft, wherein by design configuration, a near uniform distribution of internal loading to match the external airloads can be obtained. This design further allows for minimized body structure resulting in improved ratios of both useful load to gross weight and of lift to drag, with the ability to achieve high productivity at relatively low costs.

More specifically, the present design arrangement includes a relatively thick (in the range of 15 to 25 percent of the chord), highlyswept wing of low aspect ratio (less than about 6) with a substantially constant airfoil section, preferably contoured so as to delay the onset of drag rise due to compressible flow and two outer nacelles one at each remote wing tip to which an empennage assembly is attached. The wing elements are arranged to provide space for multiple rows of cargo which can be on-and-off loaded from doors provided therefor through each nacelle at the wing tips. At their adjacent or root ends the wing elements include internal passageways so that the entire swept wing constitutes a continuous cargo compartment from tip to tip. This arrangement provides the necessary cargo capacity with a minimum amount of non-lifting structure to effect substantial savings in weight and drag.

If desired, a center body or nacelle may be employed at the juncture of, i.e., between, the wing elements, and in this case, additional space is provided with greater width and head room available for outsized cargo. Also this center nacelle used in conjunction with the two outer nacelles may serve as a base structure for a three-element type of landing gear, which may be comprised of aircushion trunks one associated with the undersurface of each nacelle.

Propulsion is provided by engines preferably of the turbo-fan type mounted on the top of the wing structure and spaced at intervals along the span. This allows for the turbine exhaust of each engine to be ducted to a fixed nozzle, while the fan exhaust may be ducted to a diverter valve, permitting the fan air to be discharged through a separate nozzle for all operation except take-off and landing. In the latter modes, the fan air may thus be diverted to a spanwise duct within the wing to provide a distributed spanwise jet over the flaps and control surfaces. This action serves to provide augmented lift and control power in the low-speed flight regimes.

With the above and other objects in view, as will be apparent, this invention consists in the construction, combination and arrangement of parts all as hereinafter more fully described, claimed and illustrated in the accompanying drawings, wherein:

FIG. 1 is a plan view of a cargo aircraft designed and constructed in accordance with the teachings hereof to show generally the sweptback wings and the relationship thereof with the outer nacelles and their respective empennage assemblies, a center nacelle being employed at the adjacent or root ends of the wings;

Figure 7:
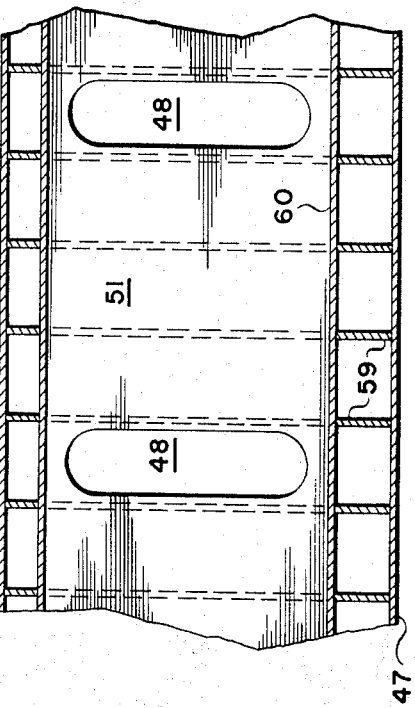
Figure 2:
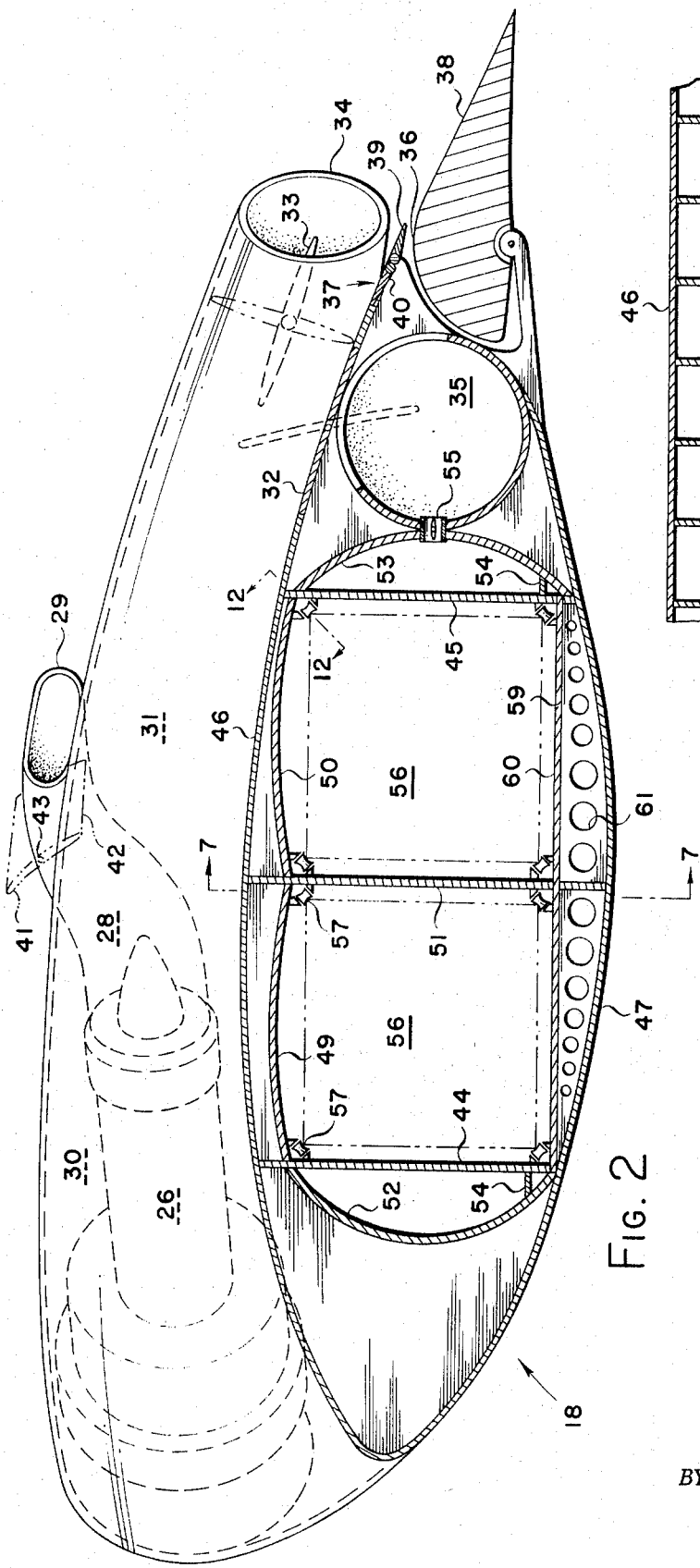
FIG. 2 is a section taken along line 2—2 of FIG. 1 to show primarily the wing structure normal to the spanwise elements and the internal arrangement thereof defining the cargo compartments together with the relationship of the wing and its components with each engine whereby exhaust ducting is accomplished to correspond to different flight regimes of the aircraft.
Figure 12:
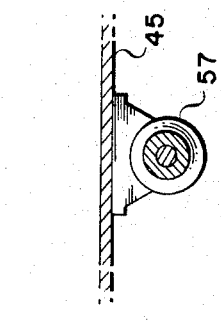
Figure 8:
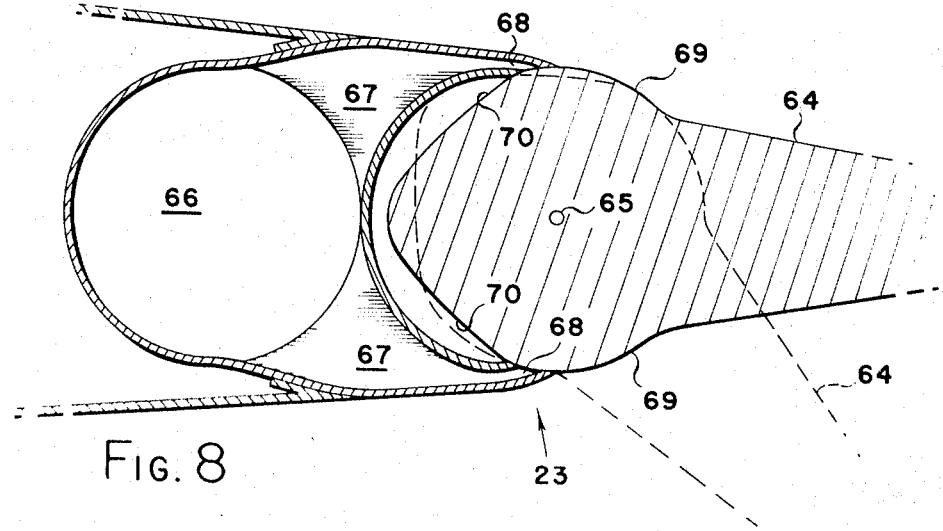
Figure 9:
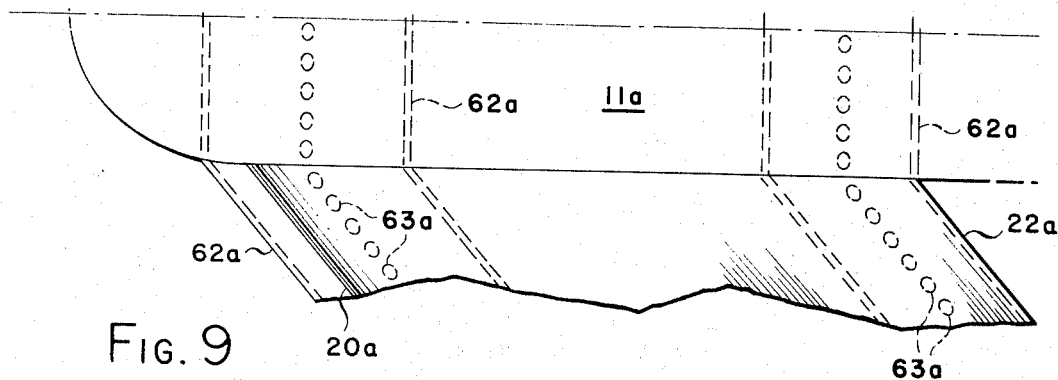
Figure 10:
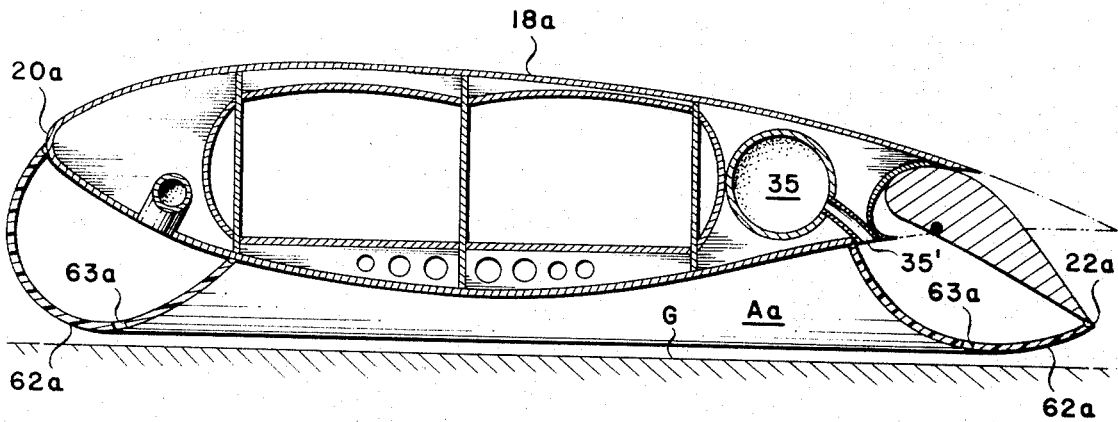

FIG. 3 is a section taken along line 3—3 of FIG. 1 to show the longitudinal structure of the centerbody or nacelle including the end closures for openings therein to permit on-and-off cargo loading of the storage compartment or hold including an associated air cushion trunk, constituting one element of the landing gear system, the open position of the end closures being illustrated in phantom lines;

FIG. 4 is a section taken along line 4—4 of FIG. 1 to show the transverse structure of each outer nacelle and the construction and mounting of the associated closure for the end opening therein to permit on-and-off cargo loading to the primary storage compartment within each wing, the open position of said closure and the inflated condition of an air cushion landing gear trunk associated therewith being illustrated in phantom lines;

FIG. 5 is a section taken along line 5—5 of FIG. 1 to show generally the chordwise wing structure adjacent the outer nacelle and empennage relationship therewith as well as the associated portion of the landing gear trunk in the inflated condition;

FIG. 6 is a section taken along line 6—6 of FIG. 3 to show the transverse structure of the center nacelle and passage of the spanwise wing ducts therethrough for the uninterrupted flow of fan air from the engines on one side of the center nacelle to the other side;

FIG. 7 is a section taken along line 7—7 of FIG. 2 to show the details of construction of one of the spanwise vertical tension members between the upper and lower wing skins;

FIG. 8 is a section taken along line 8—8 of FIG. 5 to show the transverse structure of the vertical stabilizer of the empennage, being for all intents and purposes the equivalent of the transverse structure of the horizontal stabilizer;

FIG. 9 is a plan view of one symmetrical half of the center nacelle and associated wing portion to show a modified structure thereof to include an elastic fabric attachment adjacent the leading and trailing edge portions of the wings constituting a combination variable airfoil profile means and air cushion landing system;

FIG. 10 is a chordwise cross-section taken through the wing shown in FIG. 9 to show the attachment in the fully inflated condition corresponding to landing and take-off operation and an associated surface whereby a cushion of air is contained within the area defined by the attachment or trunk to support the aircraft;

FIG. 11 is a section similar to FIG. 4 to show the outer wing tip of the aircraft with the attachment of FIGS. 9 and 10 thereon and in the fully inflated condition of FIG. 10; and FIG. 12 is a section taken along line 12—12 of FIG. 2 to show the installation of a typical flanged roller as may be positioned along the four corner intersections of each cargo compartment to support cargo containers of standardized dimensions.

Referring more particularly to the drawings, 10 designates a cargo type aircraft having a generally cylindrical center body or nacelle 11 with openings 12 and 13 at opposite ends and a generally unobstructed interior constituting a cargo storage area or compartment 14. Appropriate closures 15 and 16, respectively, are mounted following conventional practice at each end of the nacelle 11 for movement to and from positions uncovering the associated openings 12 and 13 to permit cargo on and off loading and overlying and enclosing the openings 12 and 13 whereby to form aerodynamically clean continuations of the external surface of the nacelle 11 during flight operations of the aircraft. A pilot's compartment or cabin 17 is provided in the forward end and at the top of the nacelle 11.

Extending from each side of the nacelle 11 is a wing 18 which terminates at its outer end in a generally oblong outerbody or nacelle 19 which is generally circular in section. Each outer nacelle 19 is formed with a nose that extends forwardly of the leading edge 20 of the associated wing 18 and terminates in an aft extremity 21 that is substantially adjacent the trailing edge 22 of the wing 18. An upswept empennage assembly 23 extends from the aft extremity 21 and includes a vertical stabilizer 24 topped by a horizontal stabilizer 25 forming a so-called "T-tail." Since each wing 18 and outer nacelle 19 including its empennage assembly 23 is identical, further description herein to one such half of the aircraft 10 is to be understood as applicable to the other symmetrical half of the aircraft 10 as well.

Mounted on each wing 18 is an appropriate number of engines 26. By way of example, six turbofan engines 26 are illustrated, three being mounted on top of each wing 18 with their inlet ducts adjacent the leading edge 20 of the wing 18. Spanwise engine spacing is consistent with uniform weight and thrust distribution. The hot turbine exhaust from each engine 26 is separately ducted as at 28 through a primary nozzle 29, while the relatively cool fan exhaust air is ducted as at 30 to a plenum 31. A pair of diverter valves 32 and 33 are mounted adjacent the aft end of the plenum 31. In the higher speed flight modes, valve 32 is closed and valve 33 opened whereby the fan air flows straight back through a circular fixed area nozzle 34. In the low speed flight mode valve 33 is closed and valve 32 opened so that all of the fan air flows into a spanwise duct 35 from which it emerges through a continuous slot 36 as a thrust-producing boundary layer control jet.

The effective size of this slot 36 is controllable by a spanwise, narrow chord, two-element vane 37 above the wing flap 38. The rear element 39 of this vane 37 regulates the effective nozzle area to an optimum amount for the number of engines 26 in operation while the forward element 40 functions as a thrust reverser. Since the duct 35 is connected across the center nacelle 11 (FIG. 6), the effective area of the slot 36 can be differentially regulated to provide lateral and directional trim for unsymmetrical engine thrust or to augment roll control moments.

The forward element 40 of the control vane 37 is normally closed. It is opened when reverse thrust is desired for the landing run, at which time the rear element 39 is closed. When the forward nozzle element 40 is opened, the rear nozzle element 39 is concurrently closed and vice versa, this being accomplished by any conventional means per se of no importance to the present invention. It is contemplated that this type of thrust reverser will provide about 60 percent reverse thrust without the likelihood of inlet temperature rise.

A similar type of reverser in the form of a butterfly valve 41 is incorporated forward of the primary nozzle 29. To this end the upper wall of the duct 28 is cut out and a centrally hinged vane 42 sized to fill such cutout is mounted therein on a pivot 43. This vane 42 is configured to substantially conform to the transverse size and shape of the duct 28 so that when rotated by suitable conventional means to a position at substantial right angles to the duct 28 it blocks the duct passage and thereby closes the nozzle 29. At the same time, the forward position of the duct cutout is open and the associated and portion of the vane 42 extends outwardly of the engine wall. In its opposite extreme position, the vane 42 completely fills the cutout and forms an aerodynamically clean continuation of the engine and duct walls. In this position of the vane 42, the nozzle 29 is completely open.

The major portion of the payload and all of the fuel are carried within the wing 18. To this end, the wing 18 is formed of a structural box which serves as a receptacle for both items of useful load. The boundaries of this box are the front and rear spars in the form of vertical webs 44 and 45 and upper and lower skin elements 46 and 47. The entire area may be pressurized and surrounded for this purpose by curved wall panels which include the highly curved lower skin 47, two arcuate panels or sheets 49 and 50 below the upper skin restrained by a vertical tension member or web 51 and an arcuate sheet 52 and 53 at each of the front and rear webs 44 and 45, respectively. The latter sheets 52 and 53 provide spanwise access in the form of walkways 54 for crew or other on-board personnel for inspection or servicing of the cargo. Cutouts 48 in the webs 44, 45 and 51 permit crossover between the walkways 54.

Pressurization of this cargo/fuel area can be accomplished simply by submitting bleed air from the fan plenums 31 of each engine 26. This may be accomplished in various ways all well within the known art, e.g., a series of pressure regulators 55 may be provided at spaced intervals along the duct 35.

Multiple parallel spanwise compartments 56 for cargo are designed to accommodate standard size containers. One means of retaining these containers is to install a row of rollers 57 disposed at 45° angles at each corner so that the loads will be reacted at structural intersections. By the use of dual parallel compartments 56 a total of four such compartments can be made available in the wings 18 and the center nacelle 11 can employ dual fore and aft rows of containers, for example.

The cargo space or compartments 56 may be specifically sized to accommodate standard cargo with an entrance door 58 for such cargo placed in the tip of each wing outer nacelle 19 and, as above described, with a closure 15 and 16 at the front 12 and/or rear 13 ends of the center nacelle 11. The fuel may be carried within the cargo floor structural envelope of each wing 18 which for this purpose is constructed and assembled and, if necessary, sealed in appropriate conventional manner to make it fluid tight and the ribs or bulkheads 59 supporting the floor 60 are appropriately pierced by openings 61. Both the wing cargo and fuel are balanced about 40 percent of the wing chord which is related in position to near the CG (indicated in FIG. 1) of the aircraft 10. Approximately 80 percent of the useful load is uniformly distributed spanwise from root to tip of the wings 18 while the remainder is located in the center nacelle 11.

As stated above, the principal structure of the aircraft 10 is that of the wings 18 which comprise thick, constant chord airfoils across the entire span. Each wing 18 has a sweep-back angle on the order of 30°–40° beginning at the sides of the center nacelle 11. There is no significant dihedral and no significant taper and the entire wing 18 has an incident angle within the range of 3–8 percent, with about 5 percent being preferred, relative to the supporting surface level indicated at G. The wing 18 may be constructed of sandwich material preferably with high strength fiber composite face sheets and either a honeycomb or rigid plastic form as a core material. The vertical webs 44, 51 and 45 are placed at approximately 20 percent, 40 percent and 60 percent respectively of the chord forming the boundaries of the double lobe cargo area defined by the compartments 56.

The arcuate panels or sheets 52 and 53 constitute pressure diaphragms located forward of the front web 44 and aft of the rear web 45 while the panels or sheets 49 and 50 serve a similar function under the relatively flat upper surface of the wing 18. As shown in FIG. 2, the sheets 49, 50, 52, and 53 extend spanwise of the wing 18 coacting with transverse sheets between the adjacent inner face of the wing skin to form chordwise panels interrupted centrally to define the compartments 56. While the lower surface of the wing 18 has sufficient curvature to function as a diaphragm it is primarily designed to take bending loads and hoop tension. None of these pressure diaphragms are required to be stiffened as, for example, with core material. The cargo floor 59, however, is preferably of sandwich structure designed to take both concentrated and distributed loads.

The landing gear is preferably of the air cushion type, consisting of three elements, installed at the center and the two outer nacelles. Each element is an inflatable elastomeric trunk 62 which is equipped with peripheral slots or holes 63 for the inward discharge of air which may be supplied to all of the trunks 62 by bleed air from the engine fan air distribution ducts 35 in any suitable manner such as, for example, by conduits 35'. When not in use, the deflated trunks 62 are stretched tightly against their supporting bodies 11 and 19. When the trunk 62 is inflated, the areas A defined by the several peripheral holes 63 under each nacelle 11 and 19 combine to give a three-point support to the aircraft 10. At the same time a low-pressure interface is thereby created with the supporting surface G providing compatibility with virtually any kind of surface, either terrain or water. The area defined by the peripheral nozzles or holes 63 is sufficient to provide adequate buoyancy to float the aircraft 10 in close proximity to the surface G.

As shown in FIGS. 3, 4, 5, and 6, a trunk 62 is associated with each nacelle 11 and 19 so as to provide a three-point landing gear system. Alternatively, as shown in FIGS. 9, 10, and 11, a trunk 62a may be associated with the leading and trailing edges 20a and 22a of each wing 18a. To this end, a trunk 62a is configured to the wing planform extending across the center nacelle 11a and chordwise of the wing 18a at each outer tip, i.e., outer nacelles 19a. Thus, when the trunk 62a is inflated by bleed air from the engine fan exhaust through the spanwise ducts 35 and conduits 35', the distance between the holes 63a therein defines an air cushion area Aa under substantially the entire area of the wings 18a when in ground effect. When the aircraft 10 is airborne, this trunk 62a serves to provide a cambered airfoil profile to provide effective lift augmentation. During flight, the trunk 62a is deflated and draws taut against the associated wing surface for minimum drag.

Referring specifically now to FIG. 8, a means for augmenting the lateral and directional control moments of the aircraft 10 is illustrated. The movable surface 64 represents either the rudder or elevator, as the case may be, hinged in any conventional manner about a pivot axis 65 to stationary empennage structure (either the vertical stabilizer 24 or the horizontal stabilizer 25). An extension duct 66 is connected to the air duct 35 at the outer end thereof, being disposed within the vertical stabilizer 24 and terminating adjacent the outer end tips of the horizontal stabilizer 25. Compressed air passing through the duct 66 is guided to the exterior surfaces of the movable member 64 through channels 67 terminating at the slotted nozzles 68.

When the movable member 64 is located in the neutral position, as indicated by solid lines, the slotted nozzles 68 are closed by contact with the arcuate surfaces 69, described about the pivot axis 65. When the member 64 is displaced in either direction, for example downward as shown in broken lines, the upper slotted nozzles 68 are opened due to the flat surface 70. At the same time the lower slotted nozzles 68 remain closed due to continued contact with the associated arcuate surface 69. Thus, compressed air in the duct 66 is discharged through the slotted nozzles 68 on either side of the member 64 to effect the attached flow of the free air due to removal of the boundary layer thereon.

What is claimed is:

1. An aircraft comprising a wing having tip-mounted outer bodies each terminating aft in an empennage unit consisting of a fixed vertical surface with a hinged rudder and a fixed horizontal surface mounted on top of said vertical surface with a hinged elevator, and a center body located midway between said outer bodies;

said center body having a generally unobstructed interior constituting a cargo compartment, an access opening in at least one end of said center body adapted for on-and-off cargo loading, and a removable door for each said center body opening;

said wing having a substantially constant chord length, a sweep back angle, an airfoil section having a thickness to chord ratio in the range of 15–25 percent, an internal structure defined by the external aircraft skin and comprising at least two vertical webs each extending spanwise and disposed at and along a constant chord location with the most forward and most rearward webs connected to ribs extending substantially in a chordwise direction and to said skin, at least one open cell extending spanwise of said wing between said outer bodies and bonded by chordwise panels attached to the inner face of said skin and interrupted centrally to define an interior height and width corresponding to predetermined size cargo to be placed therein, an access opening in the wall of each said outer body remote from the associated wing cell aforesaid affording entry thereto from the exterior of the aircraft, said opening having cross-sectional dimensions equal to those of the adjacent end of said cell and in substantial alignment therewith for on and off cargo loading, and a removable door adapted to close each said outerbody opening.

2. The aircraft of claim 1 including spanwise rollers in the corners of each said cell supported by said chordwise panels and said vertical spanwise webs to facilitate the movement of said cargo units thereover after admittance into one of said access openings.

3. The aircraft of claim 1 wherein said wing further includes a floor structure supported on said chordwise panels attached to the adjacent skin with the intervening space between the floor structure and skin forming a fluid-tight compartment.

4. The aircraft of claim 1 wherein said wing further includes internal spanwise curved diaphragms capable of resisting predetermined internal pressures and combining to enclose the open cargo along the forward, rearward and upward boundaries, the radius of curvature of each upper diaphragm and that of the remote, opposite skin portion being greater than that of the forward and rearward diaphragms, and said webs serve to resist the tension loads created by internal pressure acting against the adjoining differently curved diaphragms, a spanwise walkway between each said web and the associated forward and rearward curved diaphragms to permit the passage of personnel, and at least one cutout in each web to permit crossover between said walkways.

5. The aircraft of claim 1 including a plurality of turbine-driven fan type engines each mounted in a forward position on the upper surface of said wing, the turbine exhaust and fan exhaust streams being separately ducted in a rearward direction with the turbine exhaust duct enclosed in the fan exhaust duct from which it emerges in a constricted nozzle and the fan exhaust duct terminates in a constricted nozzle.

6. The aircraft of claim 5 including a spanwise duct for the passage of compressed air located immediately aft of said cargo cells and terminating rearwardly in a slot forming a nozzle located adjacent the upper surface of a hinged flap defining the trailing edge of said wing, and a pair of diverter valves one located immediately forward of said fan exhaust nozzle and the other located in an opening between said rearward fan exhaust duct and said spanwise duct, said valves being operative to direct the fan exhaust stream alternatively through said fan exhaust nozzle and through said slot nozzle.

7. The aircraft of claim 6 wherein said slot nozzle is defined by a pair of hinged vanes operable to selectively and alternatively define a rearwardly directed nozzle and a forwardly and upwardly directed nozzle.

8. The aircraft of claim 7 further including an opening in said turbine exhaust duct forwardly of its constricted nozzle, a valve adjacent said exhaust duct nozzle operative to selectively and alternatively direct turbine exhaust gas through said constricted nozzle in an aft direction relative to said aircraft and through said opening in a relatively forward direction.

9. The aircraft of claim 6 further including an extension duct connected to said spanwise duct at each outer end thereof and contained within each said fixed vertical and horizontal empennage surface, each said extension duct being located adjacent the associated hinged rudder and elevator and terminating in a slot forming a nozzle located adjacent each external surface of said associated rudder and elevator, said rudder and said elevator being formed with a first surface in contact with and overlying so as to close said slot nozzles on each side thereof when disposed in its neutral position and a second surface in spaced relation to a slot nozzle on one side only thereof when displaced from its neutral position.

10. The aircraft of claim 6 further including an extension duct connected to said spanwise duct at each outer end thereof and contained within each said fixed vertical and horizontal empennage surface, a portion of each said extension duct within each said horizontal empennage surface being located immediately forward of the associated hinged elevator and incorporating a continuous slot forming a nozzle located adjacent each external surface of said associated elevator designed and adapted to discharge exhaust air along only one of said external elevator surfaces when said elevator is displaced from its neutral position.

11. The aircraft of claim 6 further including an extension duct connected to said spanwise duct at each outer end thereof and contained within each said fixed vertical empennage surface and located immediately forward of the associated hinged rudder, said extension duct incorporating a continuous slot forming a nozzle located adjacent each external surface of said associated rudder designed and adapted to discharge exhaust air along only one of said external rudder surfaces when said rudder is displaced from its neutral position.

12. The aircraft of claim 6 wherein each of said outer bodies and said center body incorporates an air cushion to support the weight of said aircraft on adjacent surfaces by creating distributed reaction pressure acting between the underside of said bodies and said supporting surfaces, said pressure being provided by the explusion of compressed air from said engine fan ducts through said spanwise duct into an inflatable elastomeric trunk having peripheral holes.

13. The aircraft of claim 6 wherein said sweep back angle is between 30°–40° beginning at the sides of the center body and including an incident angle relative to the plane of the surface supporting the aircraft of between about 3 and 8 percent.

14. The aircraft of claim 13 wherein said wing has substantially zero dihedral and no significant taper.

15. The aircraft of claim 1 wherein three vertical webs are employed located at 20, 40, and 60 percent, respectively, of the chord.

16. The aircraft of claim 6 further including an attachment of continuous elastic fabric secured at and along the outermost edge defining the planform of said wing and at and along the undersurface of said wing inwardly of and substantially parallel to said planform edge, and duct means between said spanwise duct and the portion of said wing underlying said attachment.

* * * * *